United States Patent
Horng et al.

(10) Patent No.: US 8,820,692 B2
(45) Date of Patent: Sep. 2, 2014

(54) MOTOR CASING AND A MOTOR UTILIZING THE SAME

(75) Inventors: Alex Horng, Kaohsiung (TW);
Chia-Chin Wu, Kaohsiung (TW);
Shou-Chien Chang, Kaohsiung (TW);
Hung-Jen Chuan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 240 days.

(21) Appl. No.: 13/418,588

(22) Filed: Mar. 13, 2012

(65) Prior Publication Data
US 2012/0169160 A1    Jul. 5, 2012

Related U.S. Application Data

(63) Continuation-in-part of application No. 12/765,976, filed on Apr. 23, 2010, now abandoned.

(51) Int. Cl.
*A47F 5/00* (2006.01)
*A47F 1/10* (2006.01)

(52) U.S. Cl.
USPC .......................... 248/300; 310/60 A; 310/62

(58) Field of Classification Search
CPC ............. H02K 9/06; H02K 9/22; H02K 1/32; F04D 25/082
USPC ..... 310/239, 238, 90, 89, 60 R, 62, 63, 60 A; 248/300, 309.1
See application file for complete search history.

(56) References Cited

U.S. PATENT DOCUMENTS

| | | | |
|---|---|---|---|
| 4,506,857 A | 3/1985 | Hara et al. | |
| 4,644,204 A | 2/1987 | Lakin | |
| 5,944,497 A * | 8/1999 | Kershaw et al. | 417/423.8 |
| 6,217,353 B1 * | 4/2001 | Yu-Tse | 439/145 |
| 6,237,749 B1 | 5/2001 | Musschoot et al. | |
| 6,384,494 B1 * | 5/2002 | Avidano et al. | 310/58 |
| 6,552,464 B1 * | 4/2003 | Rahbar et al. | 310/239 |
| 6,798,098 B1 | 9/2004 | Tai | |
| 6,830,440 B1 | 12/2004 | Riddoch | |
| 8,035,269 B2 | 10/2011 | Bottger et al. | |
| 2007/0252488 A1 | 11/2007 | Kusase et al. | |
| 2011/0187212 A1 * | 8/2011 | Hino et al. | 310/62 |

FOREIGN PATENT DOCUMENTS

CN    101071964 A    11/2007

* cited by examiner

*Primary Examiner* — Amy J Sterling
(74) *Attorney, Agent, or Firm* — Alan Kamrath; Kamrath IP Lawfirm, P.A.

(57) ABSTRACT

A motor casing includes a frame assembly and a motor base. The frame assembly includes a frame having an inner face defining an air channel, and a plurality of connection members disposed in the air channel. Each connection member has first and second ends. The first ends of the connection members are coupled to the inner face of the frame. The motor base includes a supporting member and a covering member. The supporting member has an inner surface defining a through-hole, and an outer surface coupled with the second ends of the connection members. An opening portion and a coupling portion are formed at two sides of the through-hole. The covering member is coupled to the opening portion of the supporting member and has first and second surfaces. The first surface faces the through-hole of the supporting member. The covering member includes at least one vent.

13 Claims, 10 Drawing Sheets

MOTOR CASING AND A MOTOR UTILIZING THE SAME

CROSS REFERENCE TO RELATED APPLICATIONS

This is a continuation-in-part application of U.S. patent application Ser. No. 12/765,976, filed Apr. 23, 2010, now abandoned.

BACKGROUND OF THE INVENTION

1. Field of the Invention

The present invention generally relates to a motor casing and, more particularly, to a motor casing that can be coupled with components such as a coil unit or a rotor to form a motor or cooling fan.

2. Description of the Related Art

Figure 1:
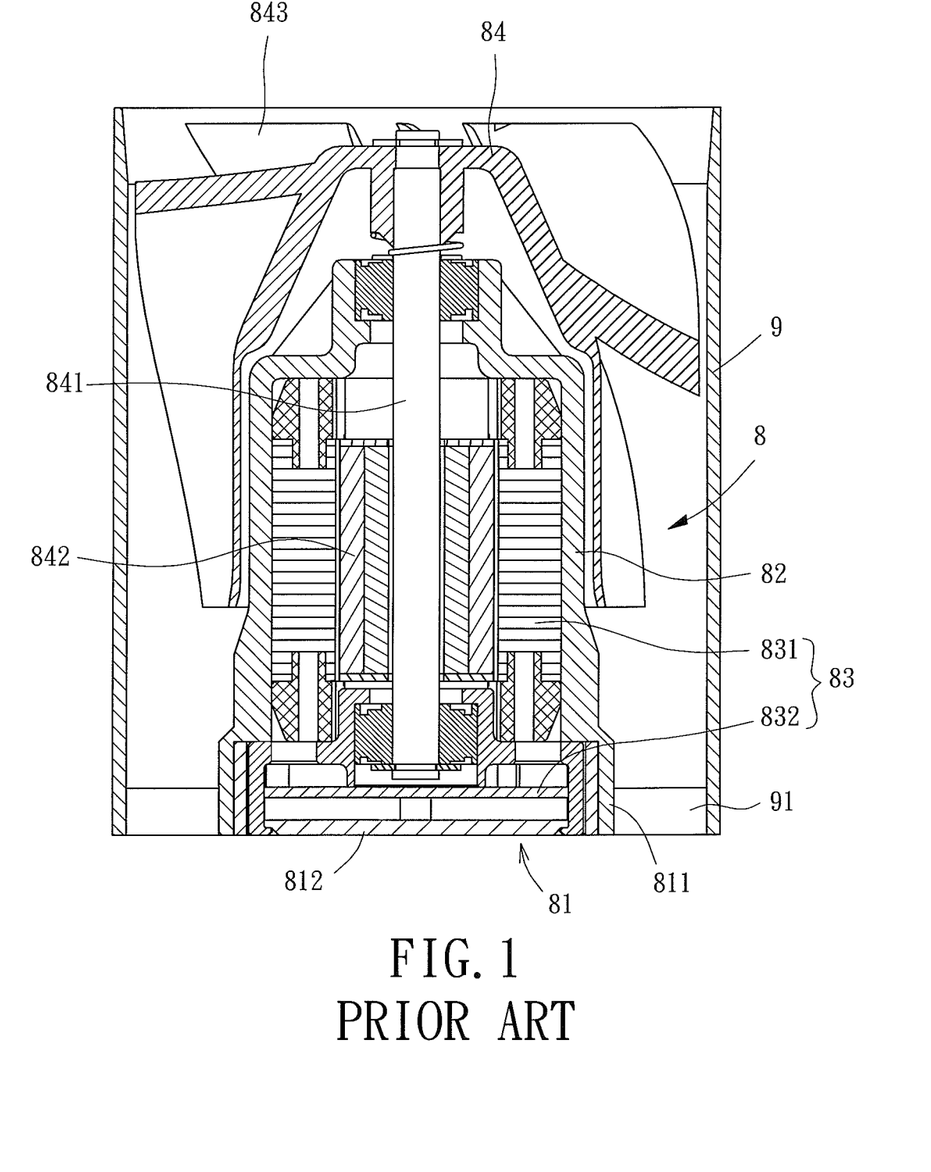
FIG. 1 is a cross-sectional view of a conventional motor with a motor base.

FIG. 1 shows a conventional motor 8 comprising a motor base 81, a housing 82, a driving assembly 83 and a rotor 84. The motor base 81 comprises a bottom ring 811 which may be coupled by a cover 812. The housing 82 is integrally formed with one end of the bottom ring 811. The driving assembly 83 is disposed in the housing 82 and comprises a coil unit 831 and a circuit board 832 electrically connected to the coil unit 831. The rotor 84 has a shaft 841 rotatably coupled to the housing 82, as well as a permanent magnet 842 located in the housing 82. An air gap is formed between the permanent magnet 842 and the coil unit 831. In such an arrangement, the coil unit 831 may drive the rotor 84 to rotate when the coil unit 831 is electrified to generate magnetic fields interacting with the permanent magnet 842 of the rotor 84.

Generally, the bottom ring 811 of the motor base 81 may be further coupled to a frame 9 via a plurality of ribs 91, and the rotor 84 may form a plurality of vanes 843 on an outer peripheral face thereof. Thus, the frame 9 may be installed in an electronic device. During rotation of the rotor 84, the vanes 843 may guide air through the frame 9 to a certain part of the electronic device where heat is often emitted, attaining cooling purposes of the electronic device.

Since the driving assembly 83 is disposed in the housing 82 and the circuit board 832 has to be electrified to allow the coil unit 831 to generate magnetic fields, the driving assembly 83 will inevitably generate a lot of heat during the operation of the motor 8. However, the motor base 81 is not designed with any structure that allows cooling of the driving assembly 83. For example, the bottom ring 811 merely serves the purposes of supporting the housing 82 or providing connection to the frame 9, and the cover 812 merely serves the purpose of shutting the housing 82. Therefore, the motor base 81 does not provide the driving assembly 83 with a desired cooling mechanism, leading to a difficulty in discharging the heat generated by the driving assembly 83. As a result, the service life of the motor 8 is shortened.

SUMMARY OF THE INVENTION

It is therefore the primary objective of this invention to provide a motor casing with a cooling mechanism in order to overcome the drawbacks of the conventional motor casing.

It is another objective of this invention to provide a motor constructed by a motor casing having a cooling mechanism, thereby prolonging the service life of the motor.

The invention discloses a motor casing including a frame assembly and a motor base. The frame assembly includes a frame and a plurality of connection members. The frame has an inner face defining an air channel. The connection members are disposed in the air channel. Each connection member has a first end and a second end. The first ends of the connection members are coupled to the inner face of the frame. The motor base includes a supporting member and a covering member. The supporting member has an inner surface defining a through-hole, and an outer surface coupled with the second ends of the connection members. An opening portion is formed at one side of the through-hole, and a coupling portion is formed at the other side of the through-hole. The covering member is coupled to the opening portion of the supporting member and has a first surface and a second surface opposite to the first surface. The first surface faces the through-hole of the supporting member. The covering member further comprises at least one vent extending from the first surface to the second surface thereof.

Furthermore, the invention discloses a motor casing including a frame assembly and a motor base. The frame assembly includes a frame and a plurality of connection members. The frame has an inner face defining an air channel. The connection members are disposed in the air channel. Each connection member has a first end and a second end. The first ends of the connection members are coupled to the inner face of the frame. The motor base includes a supporting member having an inner surface defining a through-hole, and an outer surface coupled with the second ends of the connection members. An opening portion is formed at one side of the through-hole, and a coupling portion is formed at the other side of the through-hole. The covering member is coupled to the opening portion of the supporting member and has a first surface and a second surface opposite to the first surface. The first surface faces the through-hole of the supporting member. The supporting member further includes at least one ventilation opening extending from the outer surface to the inner surface thereof.

Still further, the invention discloses a motor including a frame assembly, a motor base, a housing, a driving assembly and a rotor. The frame assembly includes a frame and a plurality of connection members. The frame has an inner face defining an air channel. The connection members are disposed in the air channel. Each connection member has a first end and a second end. The first ends of the connection members are coupled to the inner face of the frame. The motor base includes a supporting member and a covering member. The supporting member has an inner surface defining a through-hole, and an outer surface coupled with the second ends of the connection members. An opening portion is formed at one side of the through-hole, and a coupling portion is formed at the other side of the through-hole. The covering member is coupled to the opening portion of the supporting member and has a first surface and a second surface opposite to the first surface. The first surface faces the through-hole of the supporting member. The covering member includes at least one vent extending from the first surface to the second surface thereof, or the supporting member includes at least one ventilation opening extending from the outer surface to the inner surface thereof. The housing is coupled with a plurality of bearings and the coupling portion of the supporting member. One of the bearings is coupled to the shaft seat and located in the housing. The driving assembly is disposed in the housing via the opening portion and the through-hole of the supporting member. The rotor has a shaft and a permanent magnet. The shaft is rotatably coupled to the plurality of bearings, and the permanent magnet is located in the housing.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom" and similar terms are used hereinafter, it should be understood that these terms have reference only to the structure shown in the drawings as it would appear to a person viewing the drawings and are utilized only to facilitate describing the invention.

DETAILED DESCRIPTION OF THE INVENTION

Figure 2:
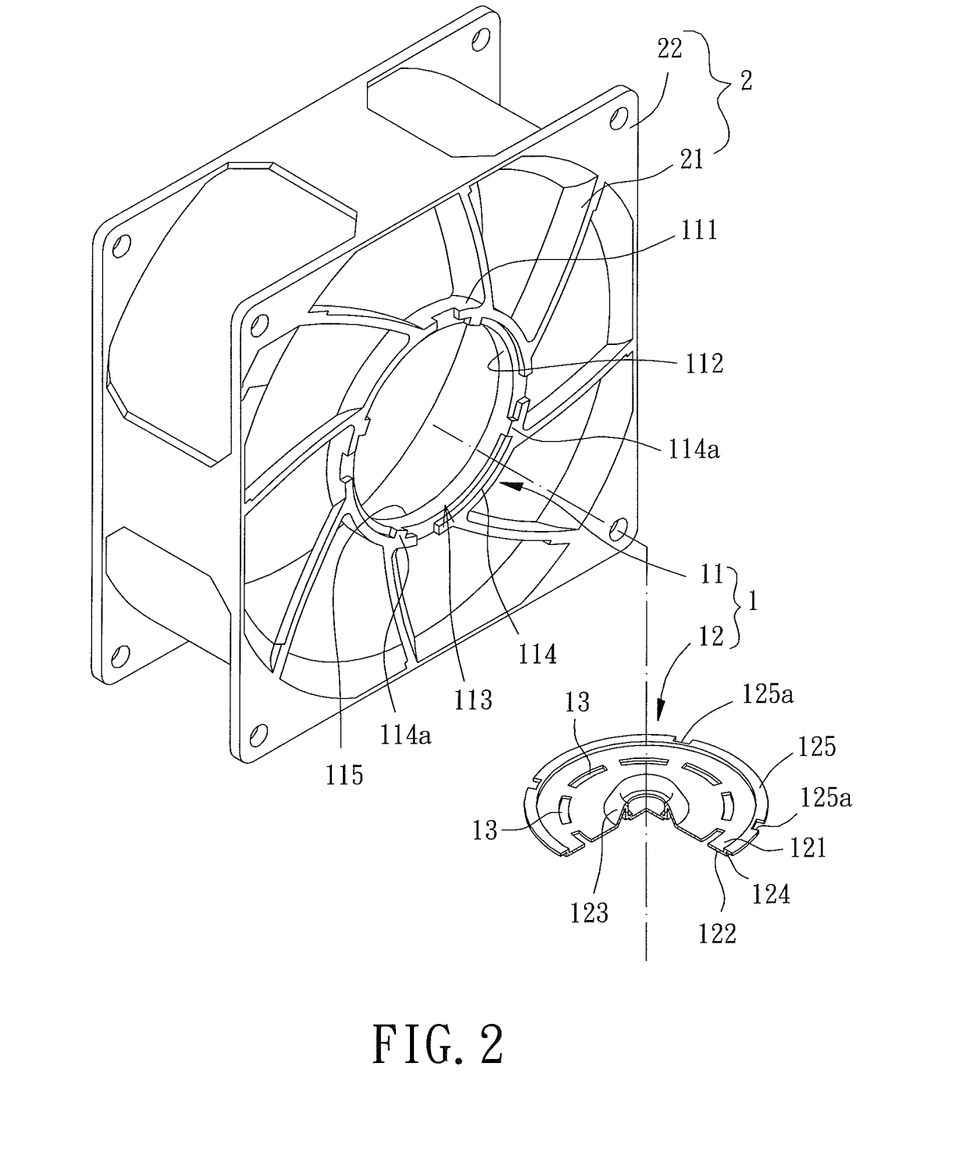
FIG. 2 is an exploded view of a motor casing according to a first embodiment of the invention.
Figure 3:
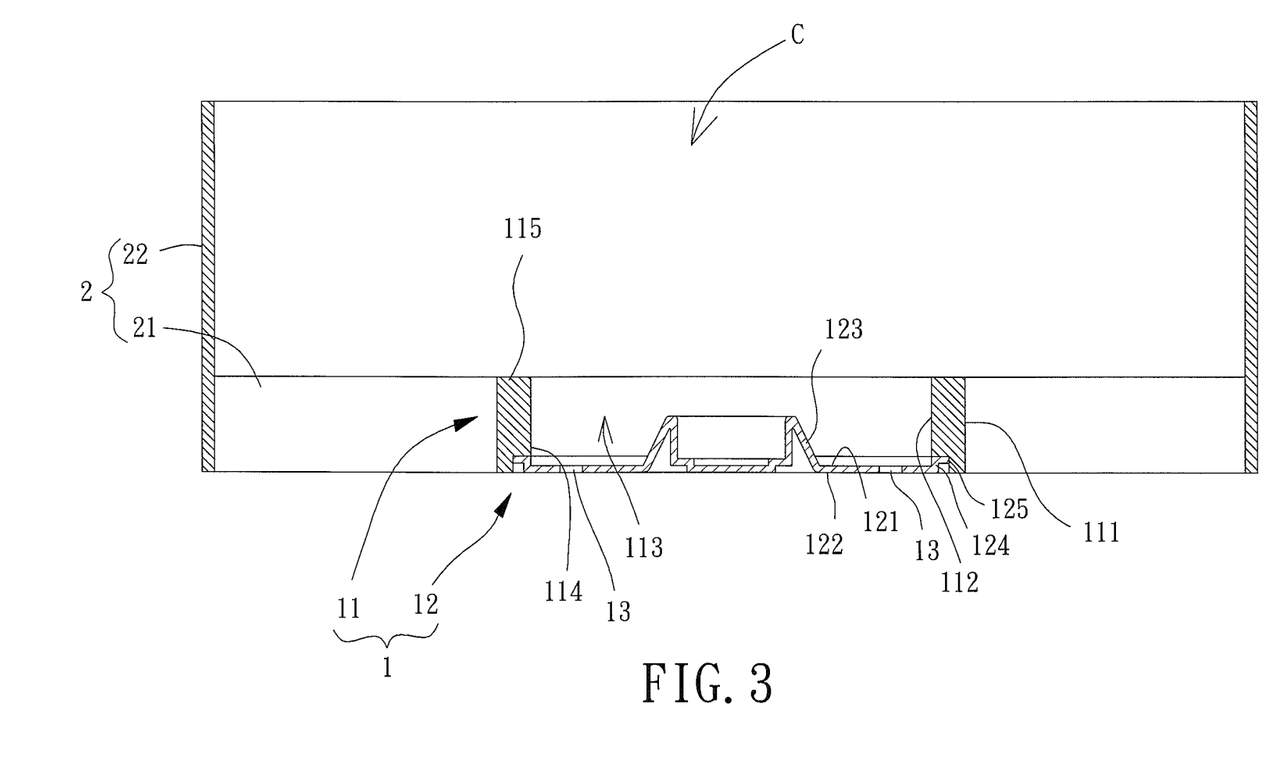
FIG. 3 is a cross-sectional view of the motor casing according to the first embodiment of the invention.

Referring to FIGS. 2 and 3, a motor casing comprising a motor base 1 and a frame assembly 2 is disclosed according to a first embodiment of the invention. The frame assembly 2 comprises a plurality of connection members 21 and a frame 22. The frame 22 has an inner face defining an air channel C. The motor base 1 is connected to the frame 22 via the plurality of connection members 21 to form the motor casing that can be used to construct a motor or cooling fan. Each connection member 21 may be in the form of a rib, and has a first end and a second end. The first ends of the connection members 21 are connected to the inner face of the frame 22, and the second ends of the connection member 21 are connected to the motor base 1. The motor base 1 comprises a supporting member 11 and a covering member 12.

The supporting member 11 is preferably in the form of a ring and has an outer surface 111 and an inner surface 112. The inner surface 112 defines a through-hole 113, with an opening portion 114 formed at one side of the through-hole 113 and a coupling portion 115 formed at the other side of the through-hole 113. The outer surface 111 of the supporting member 11 is coupled with the second ends of the connection members 21. The opening portion 114 preferably has a plurality of buckling protrusions 114a. The coupling portion 115 may be coupled to a housing, which will be described later.

The covering member 12 is coupled to the opening portion 114 of the supporting member 11. The covering member 12 has a first surface 121 and a second surface 122 opposite to the first surface 121. The first surface 121 faces the through-hole 113 of the supporting member 11 and preferably comprises a shaft seat 123 for receiving a shaft (which will be described later). In addition, the first surface 121 may form a protruding portion 124 on a periphery of the covering member 12, with the protruding portion 124 surrounding the shaft seat 123. The protruding portion 124 may form a protruding ring 125 preferably having a plurality of notches 125a, with each notch 125a corresponding to a respective buckling protrusion 114a. The quantity of the notches 125a may be the same as that of the buckling protrusions 114a so that each buckling protrusion 114a may be buckled into a corresponding notch 125a when the covering member 12 is coupled to the opening portion 114. Thus, the covering member 12 is well coupled to the supporting member 11 to prevent undesired rotation of the covering member 12.

The covering member 12 has a plurality of vents 13 extending from the first surface 121 to the second surface 122 to provide a ventilation effect for cooling purposes. However, the covering member 12 may only have one vent 13, depending on the requirements.

Figure 4:
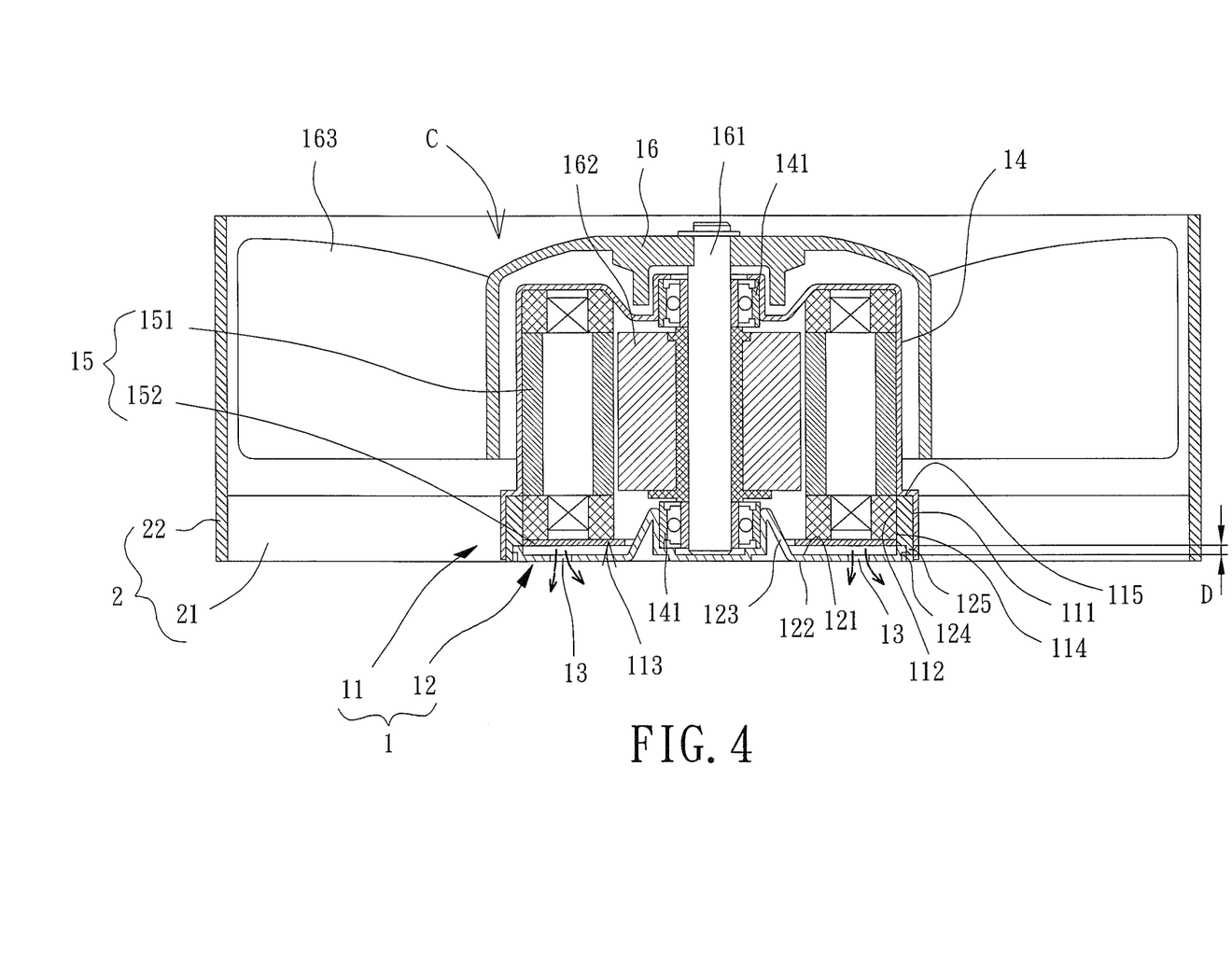
FIG. 4 is a cross-sectional view of a motor or cooling fan utilizing the motor casing of the first embodiment of the invention.

Referring to FIGS. 2 to 4, the motor casing of the first embodiment is shown to construct a motor or cooling fan. FIGS. 2 to 4 show that the motor casing of the first embodiment can construct a motor with an inner rotor and a cooling fan equipped with the motor.

The coupling portion 115 of the supporting member 11 may be coupled to a housing 14. The supporting member 11 may be integrally formed with or assembled to the housing 14. The housing 14 may be coupled to a plurality of bearings 141, with one of the bearings 141 coupled to the shaft seat 123 and located in the housing 14.

A driving assembly 15 and a rotor 16 are also provided. The driving assembly 15 is disposed in the housing 14 via the opening portion 114 and the through-hole 113. The driving assembly 15 comprises a coil unit 151 and a circuit board 152 electrically connected to the coil unit 151. The rotor 16 has a shaft 161 rotatably coupled to the bearings 141, as well as a permanent magnet 162 located in the housing 14. An air gap is formed between the permanent magnet 162 and the coil unit 151. In such an arrangement, once the coil unit 151 is electrified to generate magnetic fields interacting with the permanent magnet 162 of the rotor 16, the rotor 16 can start rotating.

The covering member 12 is provided to shut the opening portion 114 of the supporting member 11 to prevent disengagement of the driving assembly 15 and the bearings 141 from the housing 14. Thus, the supporting member 11, the covering member 12 and the housing 14 can construct a motor or cooling fan. Each connection member 21 may have one end coupled to the peripheral, outer surface 111 of the supporting member 11, as well as the other end coupled to the frame 22. The rotor 16 may form a plurality of vanes 163 on an outer peripheral face thereof.

The motor casing of the first embodiment is characterized in that the heat generated by the driving assembly 15 may be expelled from the housing 14 via the vents 13 of the covering member 12 when the motor casing is used to construct a motor or cooling fan as shown in FIG. 4. Thus, the driving assembly 15 can be prevented from overheating through the cooling mechanism provided by the motor casing, prolonging the service life of the motor or cooling fan.

Referring to FIG. 4 again, the circuit board 152 may be disposed between the protruding ring 125 and the coil unit 151. More importantly, when the protruding portion 124 is formed on the first surface 121 of the covering member 12, the protruding ring 125 may be immediately formed on the protruding portion 124. Through the protruding portion 124, it can be ensured that the circuit board 152 is spaced from the first surface 121 of the covering member 12 by a spacing D.

Thus, the heat generated by the driving assembly 15 may be expelled from the housing 14 via the spacing D and the vents 13.

Figure 5:
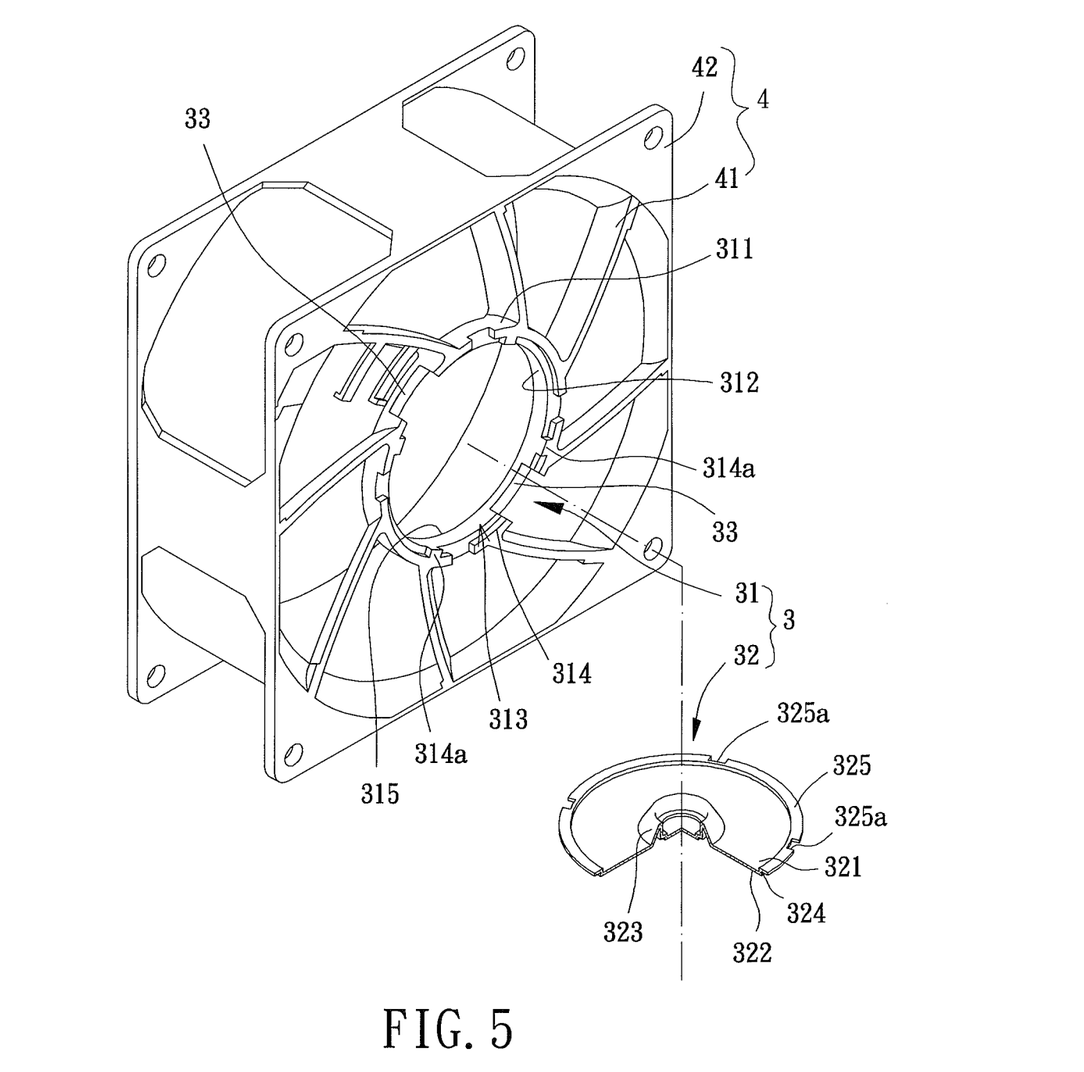
FIG. 5 is an exploded view of a motor casing according to a second embodiment of the invention.
Figure 6:
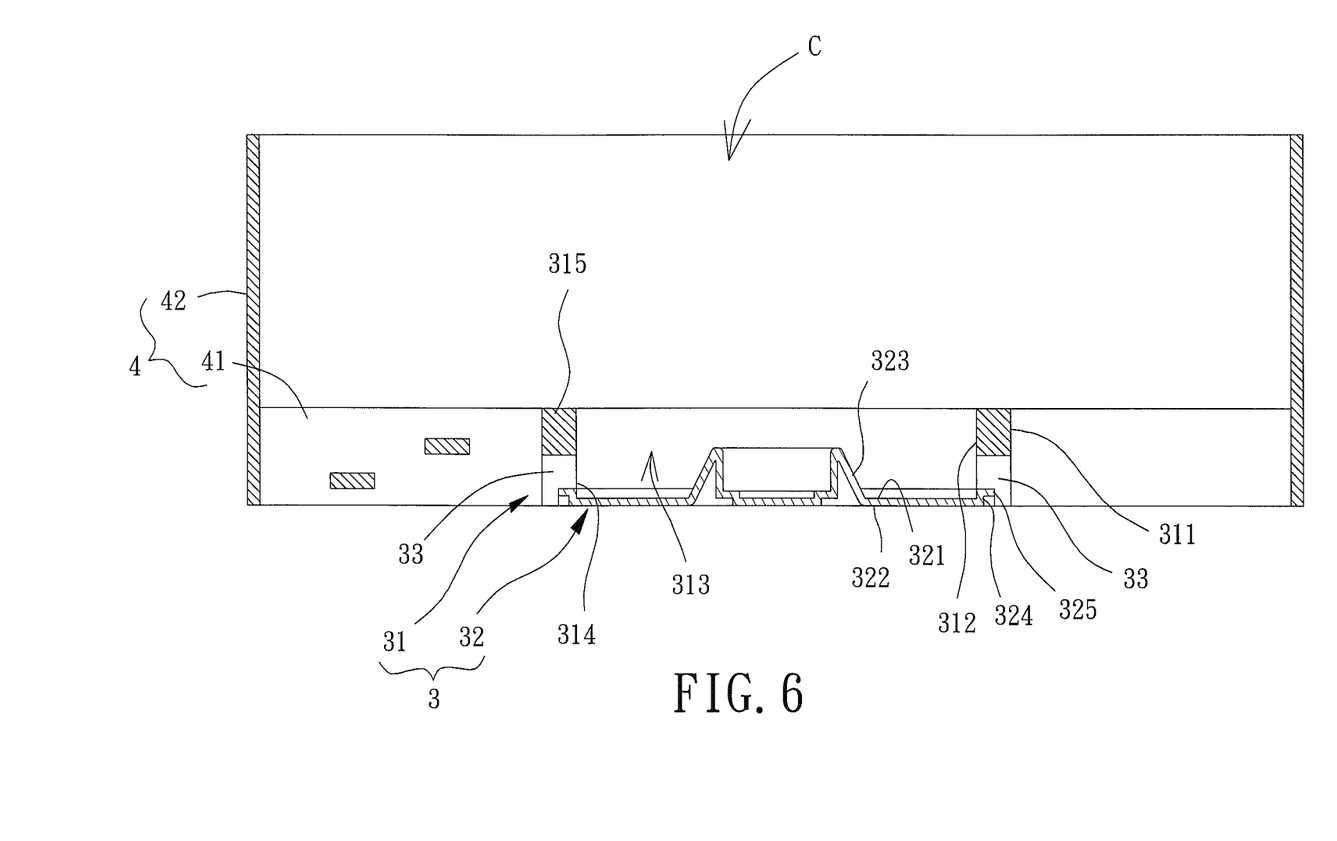
FIG. 6 is a cross-sectional view of the motor casing according to the second embodiment of the invention.

Referring to FIGS. 5 and 6, a motor casing comprising a motor base 3 and a frame assembly 4 is disclosed according to a second embodiment of the invention. The frame assembly 4 comprises a plurality of connection members 41 and a frame 42 that are similar to the connection members 21 and the frame 22 in the first embodiment. The motor base 3 comprises a supporting member 31 and a covering member 32. In FIG. 5, the supporting member 31 comprises an outer surface 311, an inner surface 312, a through-hole 313, an opening portion 314, a coupling portion 315 and a plurality of buckling protrusions 314a that are similar to those of the supporting member 11 described in the first embodiment of the invention. Also, the covering member 32 comprises a first surface 321, a second surface 322, a shaft seat 323, a protruding portion 324, a protruding ring 325 and a plurality of notches 325a that are similar to those of the covering member 12 described in the first embodiment. Further, referring to FIG. 7, the motor casing of the embodiment may also be used to construct a motor or cooling fan. The motor base 3 also comprises a housing 34, a plurality of bearings 341, a driving assembly 35, a coil unit 351, a circuit board 352, a rotor 36, a shaft 361, a permanent magnet 362 and a plurality of vanes 363 that are similar to those of the motor base 1 described in the first embodiment of the invention. Thus, similar components are not described again for brevity.

Figure 7:
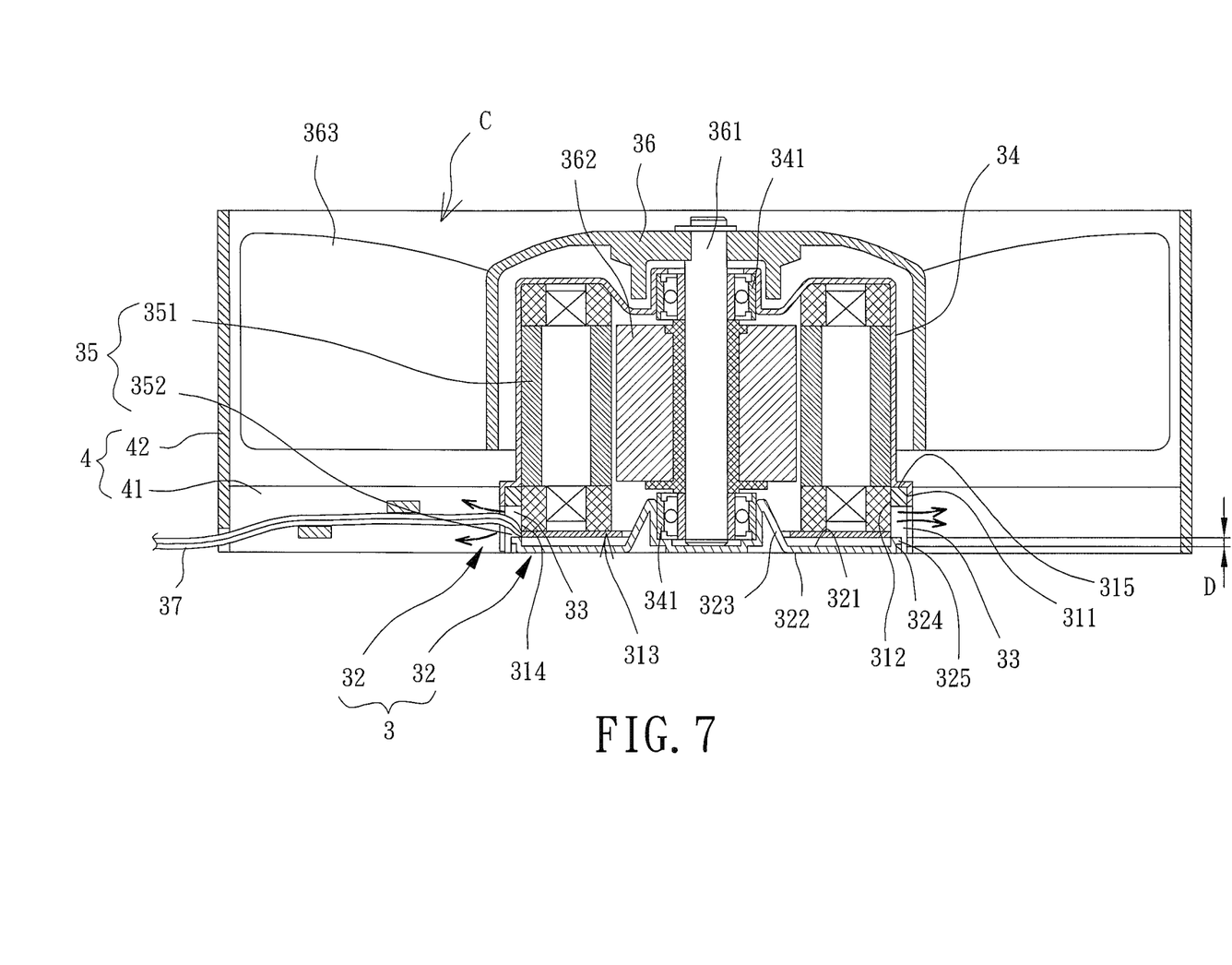
FIG. 7 is a cross-sectional view of a motor or cooling fan utilizing the motor casing of the second embodiment of the invention.

Referring to FIGS. 5 to 7, the motor base 3 of the second embodiment differs from the motor base 1 of the first embodiment since the covering member 32 does not have a plurality of vents as the covering member 12 does. Instead, the supporting member 31 is designed with a plurality of ventilation openings 33 extending from the outer surface 311 to the inner surface 312 thereof. However, the supporting member 31 may only have one ventilation opening 33, depending on the requirements. In such an arrangement, the ventilation openings 33 can also provide a ventilation effect for cooling purposes.

The motor base 3 of the second embodiment is characterized in that the heat generated by the driving assembly 35 may be expelled from the housing 34 via the ventilation openings 33. More importantly, when two or more ventilation openings 33 are provided, one ventilation opening 33 may face another one to provide an air convection effect for an improved cooling efficiency. Furthermore, when the motor base 3 has a plurality of ventilation openings 33, one of the ventilation openings 33 may serve as a wire-retaining opening allowing a power cord 37 of the circuit board 352 to extend therethrough for convenient assembly.

Figure 8:
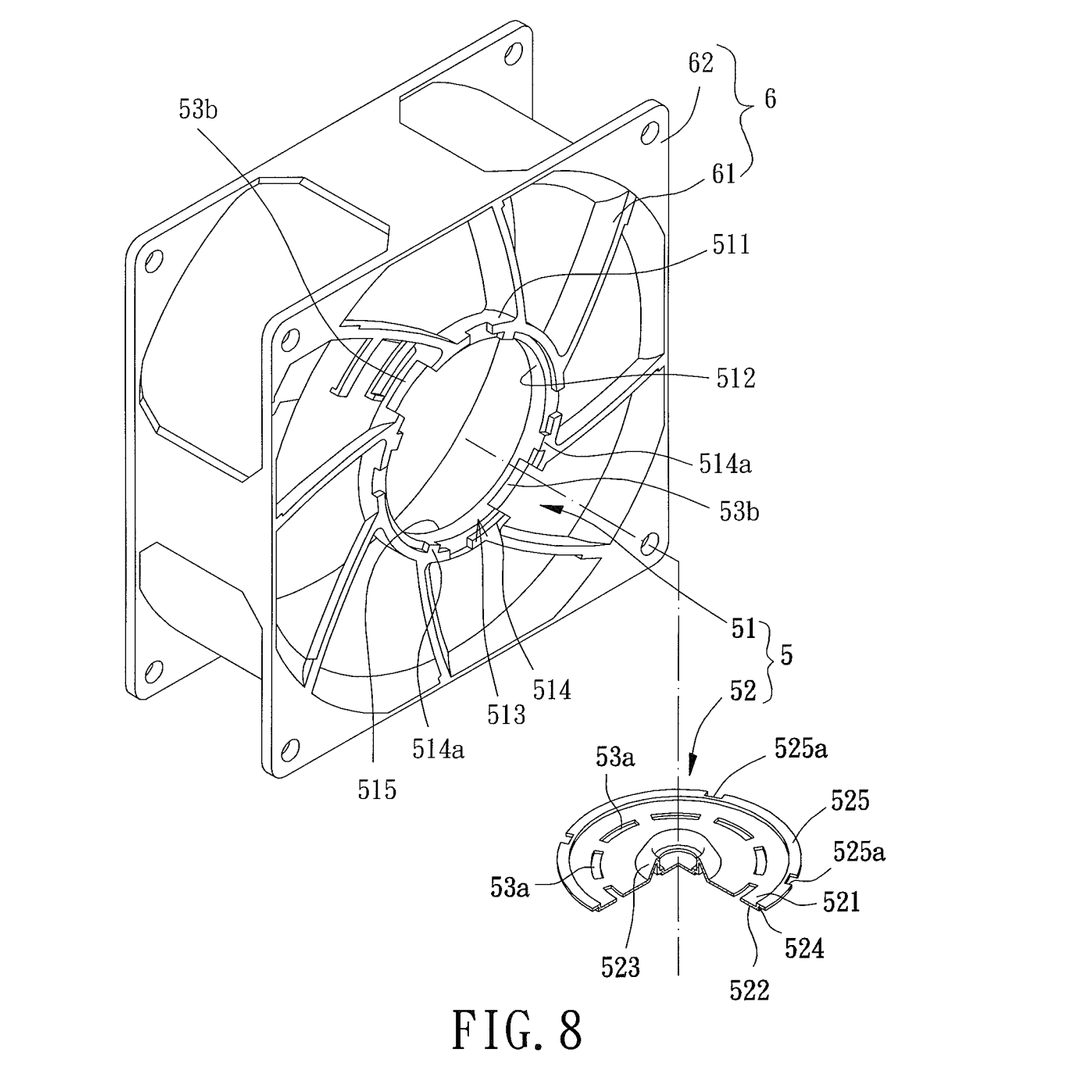
FIG. 8 is an exploded view of a motor casing according to a third embodiment of the invention.
Figure 9:
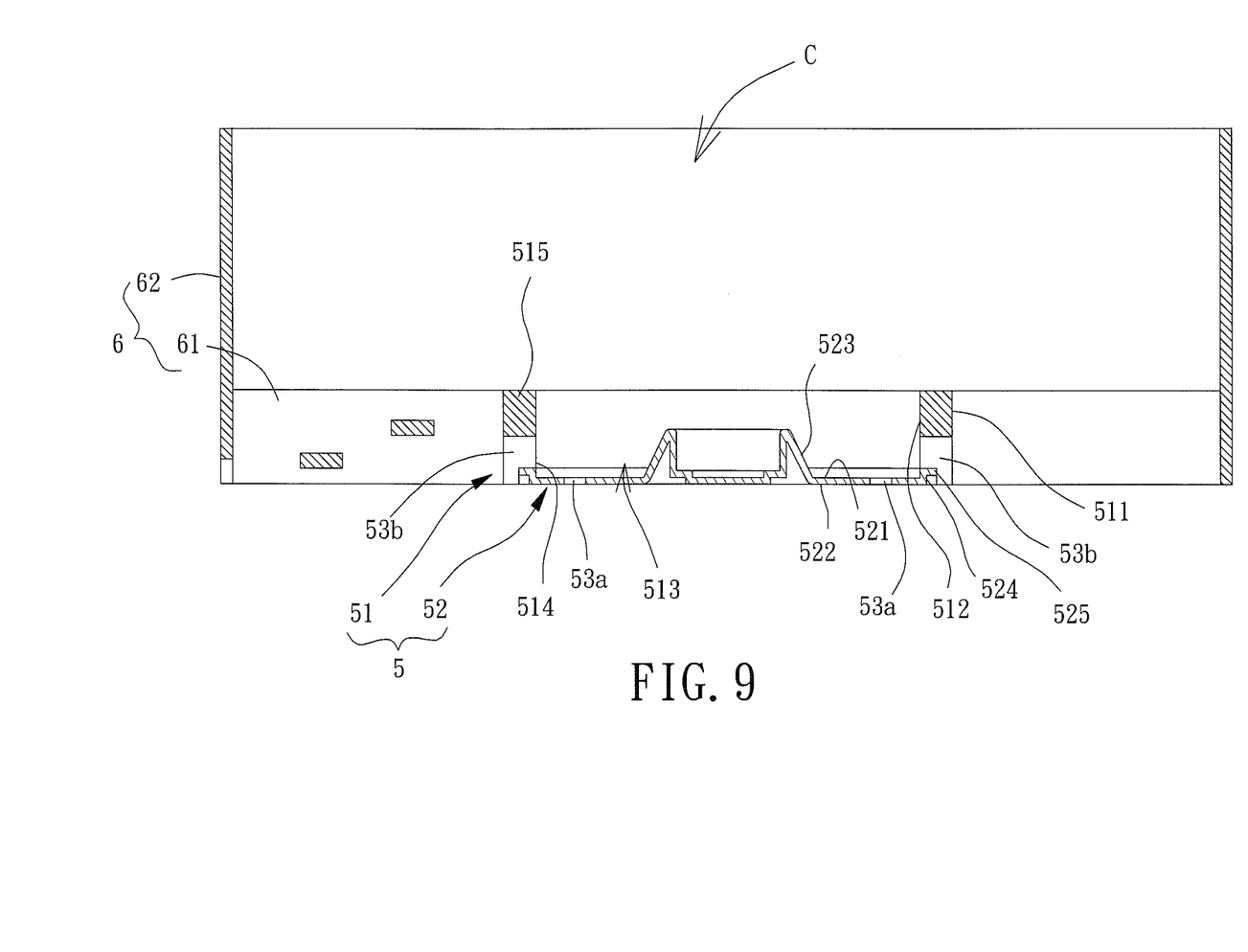
FIG. 9 is a cross-sectional view of the motor casing according to the third embodiment of the invention.
Figure 10:
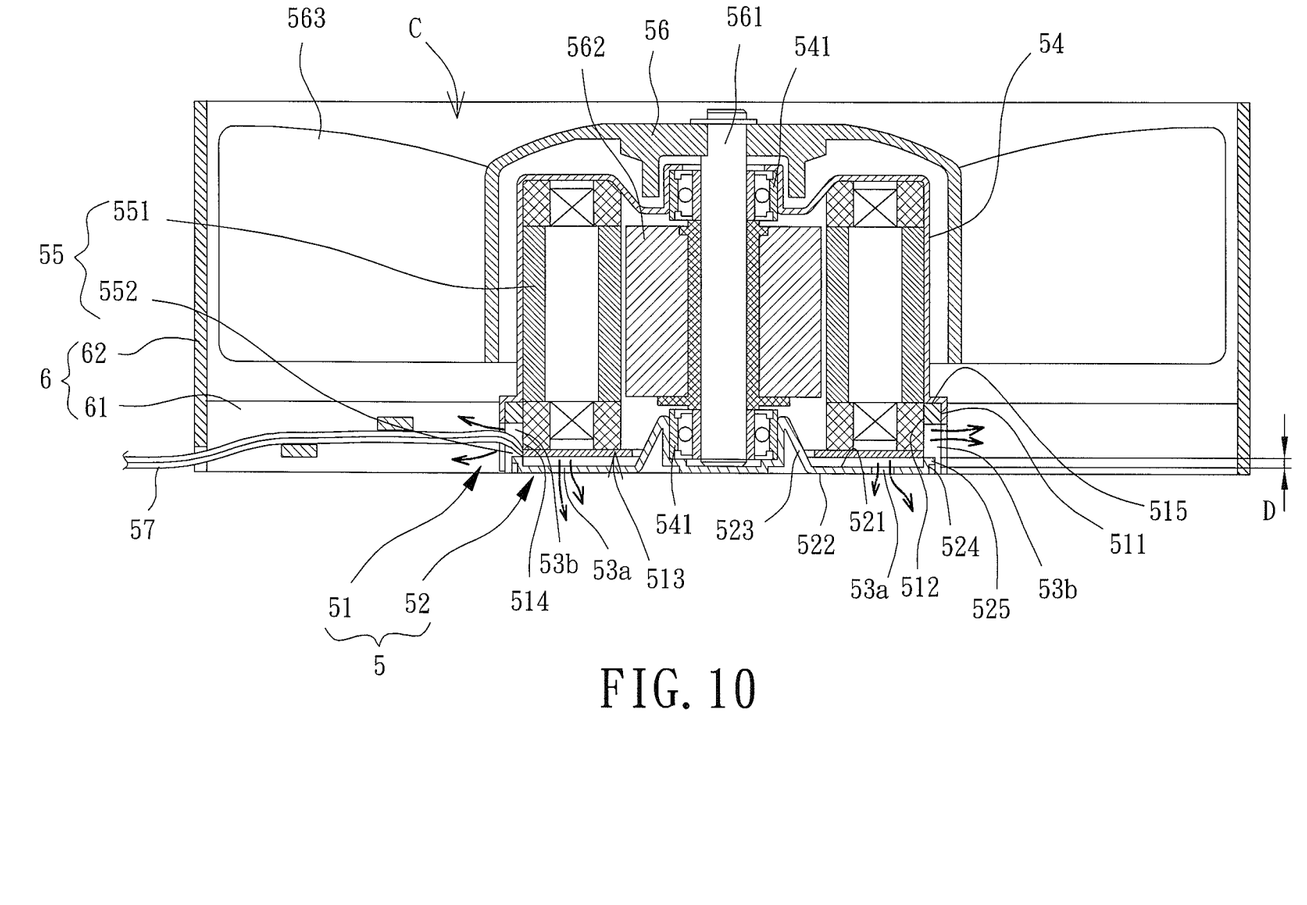
FIG. 10 is a cross-sectional view of a motor or cooling fan utilizing the motor casing of the third embodiment of the invention.

Referring to FIGS. 8 and 9, a motor casing comprising a motor base 5 and a frame assembly 6 is disclosed according to a third embodiment of the invention. The frame assembly 6 comprises a plurality of connection members 61 and a frame 62 that are similar to the connection members 41 and the frame 42 in the second embodiment. The motor base 5 comprises a supporting member 51 and a covering member 52. In FIG. 8, the supporting member 51 comprises an outer surface 511, an inner surface 512, a through-hole 513, an opening portion 514, a coupling portion 515 and a plurality of buckling protrusions 514a that are similar to those of the supporting member 31 described in the second embodiment. Also, the covering member 52 comprises a first surface 521, a second surface 522, a shaft seat 523, a protruding portion 524, a protruding ring 525 and a plurality of notches 525a that are similar to those of the covering member 32 described in the second embodiment. Referring to FIG. 10, the motor casing of the third embodiment may also be used to construct a motor or cooling fan. The motor base 5 also comprises a housing 54, a plurality of bearings 541, a driving assembly 55, a coil unit 551, a circuit board 552, a rotor 56, a shaft 561, a permanent magnet 562, a plurality of vanes 563 and a power cord 57 that are similar to those described in the second embodiment. Thus, similar components are not described again for brevity.

Referring to FIGS. 8 to 10, the casing of the third embodiment differs from the motor casings in the first and second embodiments since the covering member 52 is designed with a plurality of vents 53a extending from the first surface 521 to the second surface 522 thereof, as well as since the supporting member 51 is designed with a plurality of ventilation openings 53b extending from the outer surface 511 to the inner surface 512 thereof. In this arrangement, the motor base 3 of the third embodiment may have all the advantages of the motor casings of the first and second embodiments, providing an improved usability. However, the covering member 52 may have only one vent 53a, and the supporting member 51 may have only one ventilation opening 53b, depending on the requirements.

It can be concluded that, when the motor casings of the invention are used to construct a motor or cooling fan, the driving assemblies 15, 35, and 55 may have an improved cooling efficiency through the cooling mechanism provided by the motor casings of the first, second and third embodiments, increasing the service life of the motor or cooling fan.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. A motor casing comprising:
a frame assembly comprising:
a frame having an inner face defining an air channel; and
a plurality of connection members disposed in the air channel, wherein each connection member has a first end and a second end, and wherein the first ends of the plurality of connection members are coupled to the inner face of the frame; and
a motor base comprising:
a supporting member having an inner surface and an outer surface, wherein the inner surface defines a through-hole, wherein an opening portion is formed at one side of the through-hole, wherein a coupling portion is formed at another side of the through-hole, and wherein the outer surface is coupled with the second ends of the plurality of connection members; and
a covering member coupled to the opening portion of the supporting member and having a first surface and a second surface opposite to the first surface, wherein the first surface faces the through-hole of the supporting member, wherein the covering member forms a protruding ring on a periphery thereof, wherein the protruding ring has a plurality of notches, wherein the opening portion of the supporting member has a plurality of buckling protrusions, wherein each of the plurality of buckling protrusions is buckled into a respective one of the plurality of notches, and wherein the covering member further comprises at least one vent extending from the first surface to the second surface thereof.

2. The motor casing as claimed in claim 1, wherein the supporting member comprises at least one ventilation opening extending from the outer surface to the inner surface thereof.

3. The motor casing as claimed in claim 2, wherein the at least one ventilation opening comprises two ventilation openings facing each other.

4. The motor casing as claimed in claim 1, wherein the first surface of the covering member forms a protruding portion on the periphery of the covering member, and wherein the protruding ring is formed on the protruding portion.

5. The motor casing as claimed in claim 1, wherein the first surface of the covering member has a shaft seat.

6. A motor casing comprising:
a frame assembly comprising:
a frame having an inner face defining an air channel; and
a plurality of connection members disposed in the air channel, wherein each connection member has a first end and a second end, and wherein the first ends of the plurality of connection members are coupled to the inner face of the frame; and
a motor base comprising:
a supporting member having an inner surface and an outer surface, wherein the inner surface defines a through-hole, wherein an opening portion is formed at one side of the through-hole, wherein a coupling portion is formed at another side of the through-hole, and wherein the outer surface is coupled with the second ends of the plurality of connection members; and
a covering member coupled to the opening portion of the supporting member and having a first surface and a second surface opposite to the first surface, wherein the first surface faces the through-hole of the supporting member, wherein the covering member forms a protruding ring on a periphery thereof, wherein the protruding ring has a plurality of notches, wherein the opening portion of the supporting member has a plurality of buckling protrusions, wherein each of the plurality of buckling protrusions is buckled into a respective one of the plurality of notches, and wherein the supporting member further comprises at least one ventilation opening extending from the outer surface to the inner surface thereof.

7. The motor casing as claimed in claim 6, wherein the first surface of the covering member forms a protruding portion on the periphery of the covering member, and wherein the protruding ring is formed on the protruding portion.

8. The motor casing as claimed in claim 6, wherein the at least one ventilation opening comprises two ventilation openings facing each other.

9. The motor casing as claimed in claim 6, wherein the first surface of the covering member has a shaft seat.

10. A motor comprising:
a frame assembly comprising:
a frame having an inner face defining an air channel; and
a plurality of connection members disposed in the air channel, wherein each connection member has a first end and a second end, and wherein the first ends of the plurality of connection members are coupled to the inner face of the frame;
a motor base comprising:
a supporting member having an inner surface and an outer surface, wherein the inner surface defines a through-hole, wherein an opening portion is formed at one side of the through-hole, wherein a coupling portion is formed at another side of the through-hole, and wherein the outer surface is coupled with the second ends of the plurality of connection members; and
a covering member coupled to the opening portion of the supporting member and having a first surface and a second surface opposite to the first surface, wherein the first surface faces the through-hole of the supporting member, wherein the covering member forms a protruding ring on a periphery thereof, wherein the protruding ring has a plurality of notches, wherein the opening portion of the supporting member has a plurality of buckling protrusions, wherein each of the plurality of buckling protrusions is buckled into a respective one of the plurality of notches, and wherein the covering member comprises at least one vent extending from the first surface to the second surface thereof, or the supporting member comprises at least one ventilation opening extending from the outer surface to the inner surface thereof;
a housing coupled with a plurality of bearings and the coupling portion of the supporting member, wherein one of the plurality of bearings is coupled to a shaft seat and located in the housing;
a driving assembly disposed in the housing via the opening portion and the through-hole of the supporting member; and
a rotor having a shaft and a permanent magnet, wherein the shaft is rotatably coupled to the plurality of bearings, and wherein the permanent magnet is located in the housing.

11. The motor as claimed in claim 10, wherein the at least one ventilation opening comprises two ventilation openings facing each other.

12. The motor as claimed in claim 10, wherein the first surface of the covering member forms a protruding portion on the periphery of the covering member, and wherein the protruding ring is formed on the protruding portion.

13. The motor as claimed in claim 10, wherein the first surface of the covering member has the shaft seat.

* * * * *